United States Patent [19]
Steelman et al.

[11] Patent Number: 5,506,293
[45] Date of Patent: Apr. 9, 1996

[54] ISOTROPIC ORIENTATION OF CARBON FIBERS IN RESIN MATRIX MATERIALS

[75] Inventors: Thomas E. Steelman, Torrance; Robert W. Koon, Palos Verdes, both of Calif.

[73] Assignee: Northrop Grumman Corporation, Los Angeles, Calif.

[21] Appl. No.: 304,035

[22] Filed: Sep. 9, 1994

[51] Int. Cl.$^6$ .............................. C08J 5/06; C08K 3/04; C08L 101/00
[52] U.S. Cl. ........................ 524/496; 523/222; 523/223; 252/500; 252/511; 524/495
[58] Field of Search .................................. 523/222, 223; 524/494, 495, 496, 439, 441; 252/500, 511

[56] References Cited

U.S. PATENT DOCUMENTS

| | | | |
|---|---|---|---|
| 4,483,727 | 11/1984 | Eickman et al. | 156/181 |
| 4,602,051 | 7/1986 | Nabeta et al. | 523/137 |
| 4,675,143 | 6/1987 | Wakita et al. | 264/104 |
| 4,704,413 | 11/1987 | Nabeta et al. | 523/137 |
| 4,837,067 | 6/1989 | Carey, Jr. et al. | 428/108 |
| 4,882,304 | 11/1989 | Novich et al. | 501/32 |
| 4,911,980 | 3/1990 | Tesch | 428/357 |
| 4,960,642 | 10/1990 | Kosuga et al. | 428/407 |

Primary Examiner—Veronica P. Hoke
Assistant Examiner—U. K. Rajguru
Attorney, Agent, or Firm—Terry J. Anderson; Karl J. Hoch, Jr.

[57] ABSTRACT

An isotropic resin matrix material includes resin doped with fiberballs. Fiberballs are formed from a plurality of fibers generally radiating outward from a common node. These fibers are of sufficient numbers and separation at a distal end to form a spherical shape. The fiberballs are uniformly distributed throughout the resin. Preferably, the fibers making up the fiberballs are carbon fibers. The carbon fibers impart thermal and electrical conductivity, or dielectric loss characteristics in some configurations. These conductivity and loss characteristics are isotropic in they are the same no matter where the electrical or thermal energy is applied due to the radial structure and uniform distribution of the fiberballs. The fiberballs may also be saturated with a phase change material and encapsulated in a shell so as to impart a heat dissipation capacity to the resin matrix material. Heat impinging on the resin matrix material is transferred to the phase change material via the surface of the individual fibers making up the fiberball. Here again, the radial structure and uniform distribution of the fiberballs imparts an isotropic nature to the heat dissipation capacity.

23 Claims, 1 Drawing Sheet

ISOTROPIC ORIENTATION OF CARBON FIBERS IN RESIN MATRIX MATERIALS

BACKGROUND OF THE INVENTION

1. Technical Field

This invention relates to resin matrix materials having isotropically oriented fibers and methods for producing these materials, and more particularly to such materials and methods which employ so-called "fiberballs".

2. Background Art

Resin matrix materials, which are essentially composites of resin and fiber, have a variety of applications. Particular to the present invention are resin matrix materials which provide enhanced thermal conductivity, electrical conductivity, dielectric loss characteristics, and heat dissipation capacity. These materials include structural adhesives, elastomer gap fillers, sealants and the like, wherein the abovementioned enhanced properties are desired. In the past, resin based materials requiring enhanced thermal or electrical conductivity, or dielectric loss characteristics, have been produced by mixing fibers or particulates with the desired properties into various resins. The resins are chosen to impart the desired mechanical characteristics to the finished product, such as viscosity, bonding strength or rigidity, to name a few. Typically metallic whiskers or carbon fibers or particulates have been added to the resin to create the desired conductivity or dielectric loss properties. Various fiber lengths and packing percentages have also been used to create the desired effect.

Uniform conductivity has not been obtainable by these aforementioned methods due to the random orientation of the fibers in the materials. For instance, suppose the desired effect is increased thermal conductivity. Heat is transferred through the material largely along the fibers. Fibers oriented randomly and discretely form inherent thermal resistances at fiber/matrix interfaces throughout the material. This randomness limits the usefulness of the material as an enhanced thermal conductor. Resin matrix materials with random fiber orientations have limited usefulness as an enhanced electrical conductor, as well, for the same reasons.

Some attempts have been made to orient fibers in specific directions within the resin. However, the net effect of this is to improve the conductivity in only the direction of the fibers. In fact, the conductivity in directions perpendicular to the oriented fibers is actually worsened.

Similar problems exist when using resin matrix materials having random or directional fiber alignment in dielectric loss applications. Materials with dielectric loss characteristics are typically used to dissipate an electric field applied to the material. In a sense, the fibers in the material act like individual resistors converting the electrical energy to heat. In many applications, the key to a useful resin matrix material with dielectric loss characteristics is uniformity. The loss characteristics must be the same no matter what direction the electric field is applied. However, a fiber's orientation in respect to the direction of the impinging electric field will effect its dissipative capability. Therefore, in the case of randomly orientated fibers, the overall dielectric loss characteristic of the resin matrix material will vary depending on the angle of incidence of the electric field. This is unacceptable in situations where uniformity is essential. Likewise, resin matrix materials with fibers oriented in particular directions will vary in its dielectric characteristics depending on the direction of the electric field because the fibers will not dissipate the electrical energy to same degree in one direction as compared to another.

Therefore, what is needed is a resin matrix material having enhanced conductivity or dielectric loss characteristics which is isotropic in nature. In other words, the material should exhibit the same degree of thermal and/or electrical conductivity, or dielectric loss, regardless of the where the heat or electrical energy is applied.

The formulation of heat dissipating resin matrix materials used for passive thermal management of transient heat sources has previously involved the addition of encapsulated phase change materials to the resin. Typically, these encapsulated materials are glass microballoons filled with wax. Heat energy transferred to the material is dissipated when the wax inside the microballoons melts. The rate of heat dissipation in this system is limited in part by the speed at which the heat energy is transferred from the resin to the wax. Ideally, the surface area of the interface between the resin and wax should be maximized to maximize this rate of transfer. However, in the case of wax-filled glass balloons, the available heat transfer surface area is limited to that of the glass balloon surrounding the wax. This is the reason these glass balloons must be so small. Many smaller balloons dissipate heat faster than fewer larger balloons, assuming some maximum packing factor for each, because the surface area of wax-to-glass is larger in the case of the more numerous smaller balloons. Unfortunately, the production of these smaller balloons is expensive.

Therefore, what is needed is a phase change material for incorporating into the resin of a heat dissipating resin matrix material such that the available heat transfer surface area between the resin and the phase change material is maximized and exceeds that provided by the conventional glass micro-balloons, and which is less expensive to produce.

SUMMARY

Wherefore, it is an object of the present invention to provide a resin matrix material having enhanced conductivity or dielectric loss characteristics which is isotropic, thereby exhibiting the same degree of thermal and/or electrical conductivity, or dielectric loss, regardless of the where the heat or electrical energy is applied to the material.

Wherefore, it is another object of the present invention to provide a resin matrix material which has a phase change material incorporated therein for dissipating heat such that the available heat transfer surface area between the resin and phase change material is maximized and exceeds that provided by the conventional glass micro-balloons, and which is less expensive to produce.

The foregoing objects have been attained by an isotropic resin matrix material including resin and a plurality of fibers generally radiating outward from a common node. These fibers are of sufficient numbers and separation at a distal end to form a spherical fiberball. In addition, the fiberballs are uniformly distributed throughout the resin. Preferably, the fibers making up the fiberballs are carbon fibers.

the number, fiber resistivity, and fiber aspect ratio of the fiberballs disposed within the resin matrix material is sufficient to endow the material with a desired dielectric loss characteristic, but not so large as to undesirably degrade the mechanical properties of the material.

In one preferred embodiment of the present invention, the space separating the fibers of the fiberball is saturated with resin, and the number, fiber resistivity, and fiber aspect ratio of the fiberballs disposed within the resin matrix material is sufficient to endow the material with a desired level of electrical and thermal conductivity, but not so large as to undesirably degrade the mechanical properties of the material. Additionally, the number of fiberballs disposed within the resin matrix material can be made not so large as to exceed a pre-determined weight per unit volume of the material. In doing this, fiberballs of at least two different sizes may be employed. Their sizes are chosen to maximize packing of the fiberballs within the resin.

In another preferred embodiment of the present invention the space separating the fibers of the fiberball is again saturated with resin. However, in this case the number of fiberballs disposed within the resin matrix material is sufficient to endow the material with a desired dielectric loss characteristic, while still not so large as to undesirably degrade the mechanical properties of the material. In this embodiment too, the number of fiberballs disposed within the resin matrix material may be limited so as not to exceed a pre-determined weight per unit volume of the material.

In yet another preferred embodiment of the present invention the space separating the fibers of the fiberball is saturated with a phase changing material, and both are encapsulated by a shell. The phase changing material is capable of changing phase at a desired temperature. In this case, the number of fiberballs disposed within the resin matrix material is sufficient to endow the material with a desired amount of heat dissipation capacity. But again, the number is not so large as to undesirably degrade the mechanical properties of the material, or additionally not so large as to exceed a pre-determined weight per unit volume of-the material, if either of these conditions is of concern. The number of fiberballs disposed within the resin matrix material in this embodiment can be of at least two different sizes to maximize packing of the fiberballs within the resin.

The radial structure of the fibers making up the fiberballs gives the resin matrix material its isotropic characteristic. This results because the fibers of each fiberball radiate in all directions. Thermal energy and electrical current are transferred out along each fiber. Adjacent fiberballs receive this energy and current, and transfer it in the same manner. Thus, no matter where the energy or current is applied to the material, it propagates in the same way. Accordingly, the conductivity or dielectric loss characteristics of the material are made isotropic. In addition, it has been found that per unit volume of fiber, a fiberball doped resin will exhibit almost two orders of magnitude higher electrical conductivity, than resin doped with randomly oriented fibers.

The radial nature of a fiberball also accounts for an improvement in heat dissipation capacity over the conventional glass balloon dopants of a resin doped by fiberballs saturated with a phase changing material and encapsulated by a shell to retain the phase change material. This improvement derives from the fact that the heat transfer surface area presented by the radial fibers far exceeds that of the glass balloons without fiber. Thus, more heat can be transferred to the phase change material in the same amount of time, thereby increasing the heat dissipation capacity of the resin matrix material, and allowing the encapsulated fiberballs to be larger in size than conventional wax-filled microballoons. In addition, since fiberballs are an inexpensive waste by-product of a process to flock fibers onto surfaces, and because the saturated fiberballs are less expensive to encapsulate due to their larger size, they should be considerably cheaper to manufacture than the conventional wax-filled microballoons usually employed.

Accordingly, it can be seen that all the stated objectives of the invention have been accomplished by the above-described embodiments of the present invention. In addition, other objectives, advantages and benefits of the present invention will become apparent from the detailed description which follows hereinafter when taken in conjunction with the drawing figures which accompany it.

DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
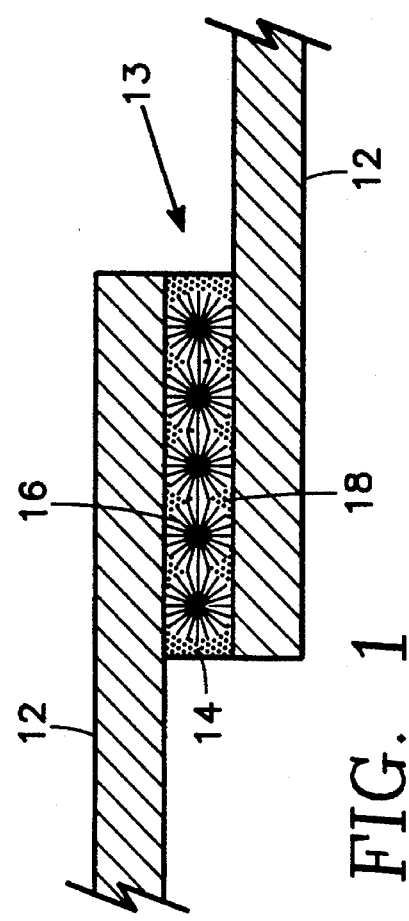
FIG. 1 is a cross-sectional view of a two plates joined by a resin matrix material embodying the present invention wherein the resin matrix material includes an adhesive resin uniformly doped with fiberballs.

The preferred embodiments of the present invention all employ fiberballs. Fiberballs are a waste by-product of electrostatic fiber flocking processes. In general, these flocking processes entail the application of fine fibers to the surface of an adhesive covered object. Electrostatic flocking is a technique that uses an electric field to apply the fibers. An electrode gives the individual fibers an electric charge. Thereafter, the fibers orient longitudinally with the electric field lines and are drawn toward an opposite pole along these lines. The opposite pole is usually the object itself. Thus, the fibers impact the object in a perpendicular alignment and become imbedded into the adhesive in an upright position. However, not all the fibers reach the adhesive-covered object.

Some of the fibers that do not reach the object form the aforementioned fiberballs. As described above, the electrically charged fibers align longitudinally in the electric field lines. This occurs because the charged fibers become dipolar. When two fibers encounter one another in the electric field, they stick together at their oppositely charged ends. These first two fibers encounter others, and new fibers tend to become attached with one end anchored at the junction of the first two, and their other end projecting radially outward. Eventually, as more and more fibers become attached, a fiberball is formed having numerous fibers generally radiating outward from the common center. If the process is continued, even more fibers become lodged in the fiberball structure, although because the common center is substantially filled with fiber ends already, these later fibers tend to embed into the spaces between the original fibers with their ends somewhat removed from the common center. However, the latter fibers are still oriented in a generally radial direction. Finally, it is noted that the fiberballs, once formed, remain intact when removed from the electric field.

Typically, the aforementioned fibers used in the flocking process are all approximately the same length. However, fiberballs of varying sizes are produced from these generally uniform fibers because of the aforementioned process of fibers embedding in the spaces between other fibers, but with their ends somewhat removed from the common center. The more fibers that are embedded in this way, the larger the diameter of the fiberball becomes. Thus the size of the fiberball is related the number of fibers that became embedded in the fiberball during its formation. Generally, current fiber flocking technology limits the flocking fiber size to between about 0.020 and 0.250 inches. Accordingly, fiberballs are available in a variety of sizes having radii beginning in this range, but extending out to indefinite larger sizes. The choice of the size or sizes of fiberballs to be used in the resin matrix material for the most part depends on its application. For example, in a thermally or electrically conductive material used as a structural adhesive, the fiberball would ideally be no larger in diameter than the desired bondline thickness. This limitation in size ensures a proper bond between the two surfaces being joined by the adhesive. Similarly, when employed in an application such as a parasitic layer, the fiberballs would best be no larger than the desired thickness of the layer. This is not to say that the fiberballs could not be smaller than the layer thickness. Especially in parasitic layers, which could be quite thick compared to an adhesive bondline, the fiberballs might be smaller. In such a case, several layers of fiberball could be formed within the parasitic layer. Generally, the above-described sizing is also applicable to resin matrix material where enhanced dielectric loss characteristics or heat dissipation capability are desired.

It is the unique structure of the fiberball that makes them advantageous for use in resin matrix materials as fillers to enhance thermal and/or electrical conductivity, dielectric loss characteristics, and heat dissipation capacity. The fiberballs, because of their radially disposed fibers, can be utilized to create an isotropic material, i.e. one having the same properties along all axes. It should be noted that a few fibers will attach crosswise during the forming of the fiberballs, mostly on the outer surface of the fiberball. However, it has been found that these few crosswise fibers will not adversely effect the isotropic properties of the fiberballs.

Fiberballs are mechanically stable when mixed into a resin. Capillary forces cause the resin to wick into the porous fiberball structure. Once the interconnections between fibers in the fiberball becomes saturated with resin, they are not easily crushed. This makes the manufacture and use of fiberball-doped resin matrix materials simple and inexpensive. If the fiberball can be mixed into the resin without great turbulence, no special precautions need to be taken. The fiberballs will saturate in the resin before any damage is sustained. However, it has been found that if rough mixing is required, the fiberballs are less likely to be damaged if they are first "washed" with resin before being mixed. This wash could entail spraying or dipping the fiberballs, among other methods. The key is to saturate the fiber interconnections within the fiberball before it is subjected to any rough handling.

Preferred embodiments of the present invention will now be described with reference to the drawings. FIG. 1 shows two plates 12 joined together with an adhesive layer 13. The adhesive layer 13 comprises an adhesive resin 14 that has been doped with fiberballs 16. These fiberballs 16 are preferable made from carbon fibers. This preference stems from the fact that carbon fibers with a wide range of electrical and thermal properties are commercially available. For instance, if the resin matrix material is desired to have an extremely high electrical and thermal conductivity, vapor grown carbon fibers are available with electrical resistivity as low as about 0.6 $\mu\Omega$-m and thermal conductivity as high as about 3000 W/m-K. However, it should be noted that the cost of vapor grown carbon fibers is relatively high. Therefore, pitch based carbon fibers are preferred for applications calling for high electrical and thermal conductivity where cost is also a concern. This type of fiber is not as conductive as the vapor grown variety (i.e. electrical resistivity in the order of 1.2 $\mu\Omega$-m and thermal conductivity on the order of 1000 W/m-K). However, the ratio of conductivity to cost is higher for pitch based fibers. On the other hand, if the resin matrix material is desired to have a dielectric loss characteristic, carbon fibers with relatively high resistivity are preferred. Pan based carbon fibers are available to meet this need. These types of carbon fiber exhibit electrical resistivity over a range of $10^3$ to $10^{10}$ $\mu\Omega$-m, making them suitable for the aforementioned dielectric loss applications. Another advantage of carbon fibers is that they will not corrode. Conventional resin matrix materials often employ metallic whiskers which are susceptible to corrosion. This corrosion degrades the thermal and electrical conductivity of the material.

The carbon fibers making up the fiberballs 16 are both electrically and thermally conductive. Therefore, the configuration shown in FIG. 1 could be used to conduct electrical current or heat, or both, between the plates 12. It should be noted that the use of a structural adhesive 14 used to bond the two plates 12 together in FIG. 1, is merely intended as example of an embodiment of the present invention which enhances the thermal and/or electrical conductivity of a resin matrix material. Alternately, the fiberballs could have been shown doping resins more suited for elastomer gap fillers, sealants, or other applications. These materials could be disposed between surfaces, as shown in FIG. 1, or they could form a parasitic layer on a surface, among other applications. A parasitic layer is a surface covering, like paint, which provides protection to the underlying material or provides properties not inherent in the underlying materials. However, the specifics of the following discussion concerning the doping of the adhesive 14 shown in FIG. 1 with carbon fiberballs, and the enhanced thermal and electrical properties attributable thereto, are equally applicable to these other resins, as well. Therefore, it is not intended that the present invention be limited to a structural adhesive, but be extended to any resin matrix material requiring enhanced thermal and/or electrical conductivity. In addition, as the resins employed for various applications are well known, and not a novel part of the present invention, no in-depth description will be provided herein concerning the specific types of resin used.

FIG. 1 shows the fiberballs 16 tightly packed in the adhesive resin 14, to the point that they touch one another. This is the ideal condition for enhancing the thermal and electrical conductivity of a material. In fact, the more contact between adjacent fiberballs 16, the better. As such, even though only one size of fiberball 16 is depicted in FIG. 1, the material could include a variety of different sized fiberballs 16. Depending on the quantity and size range of the fiberballs, the contact area between them could be increased. For instance, if smaller fiberballs sized to fit into gaps 18 between the fiberballs 16 were mixed into the resin, the area of contact between the fiberballs could increase. For solid (i.e. non-foamed) resins 14, the thermal and electrical conductivity increases with increasing concentrations of fiberballs 16. However, the concentration of fiberballs 16 will have an effect on the mechanical properties of the resin matrix formed, as well. It is believed that up to certain point, the addition of fiberballs 16 will improve the mechanical properties of the matrix over that of the resin 14 alone. But, it appears that the concentration can become so great that the mechanical properties of the resin matrix would begin to degrade. This point seems to be reached when the fiberballs 16 are so numerous that they are not completely saturated with resin 14, thereby creating gaps. Therefore, a tradeoff between maximizing conductivity and degrading the mechanical properties of the resin 14 exists. It is believed that a range of about 40–60 percent by volume of fiberballs 16 to resin 14 will provide high conductivity while minimizing degradation. Of course, depending on the application, the fiberball-resin matrix may not need to have optimum mechanical properties. In these cases, the concentration of fiberballs 16 could be decreased to well below the aforementioned 40–60 percent. The situation is different for foamed resins, however. The weight of the fiberballs 16 must be taken into consideration in these types of resins. As stated, fiberballs have a porous structure. Once saturated with resin 14, the weight difference between the resinated fiberballs 16 and an equivalent volume of pure resin 14 is insignificant. Therefore, only a minimal weight penalty exists from adding fiberballs 16 to a solid resin matrix material. However, the resinated fiberballs 16 maybe heavier than an equivalent volume of foamed resin. Thus, the overall weight of a foamed resin matrix material can be increased by the addition of fiberballs 16. If weight is a factor in the particular application in which a foamed resin material is being employed, the aforementioned percentage of fiberballs 16 may have to be reduced, at the expense of higher conductivity.

In addition to providing isotropic conductivity, it has been found that for the same amount of fiber, the overall conductivity of the resin matrix material is higher in resin 14 doped with fiberballs 16, than randomly oriented fibers. This improved overall conductivity results from the transfer efficiency afforded by the radial structure of the fiberballs 16. Electrical current or thermal energy would be transferred in inefficient manner due to lack of direct contact between the randomly oriented fibers. However, in a resin matrix material doped with a uniform distribution of fiberballs 16, the electrical current or thermal energy propagates between adjacent fiberballs in an efficient manner from the place of incidence, via orderly paths of direct contact between conductors. Thus overall, the conductivity is higher due to this orderly and direct propagation through the material for the same amount of fiber.

Figure 2:
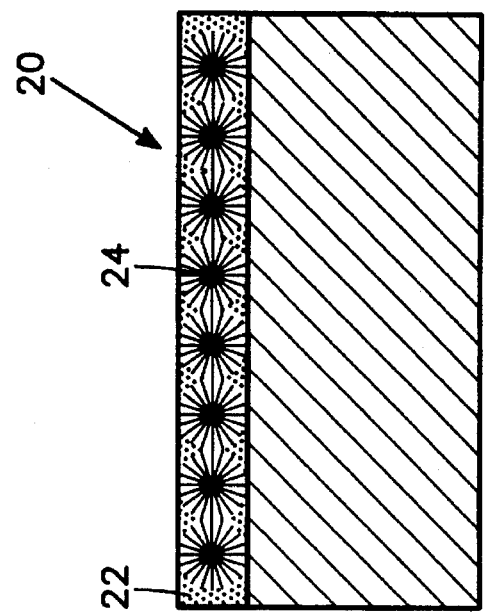
FIG. 2 is a cross-sectional view of a parasitic layer made of a resin matrix material embodying the present invention wherein the resin matrix material includes a resin uniformly doped with fiberballs.

FIG. 2 shows a parasitic layer 20 of a resin 22 with an enhanced dielectric loss characteristic. This enhanced dielectric loss characteristic is provided by the fiberballs 24 dispersed throughout the resin 22. The concentration of fiberballs 24 added to the resin 22, the resistivity of the fiber within the fiberballs 24 and the aspect ratio (i.e. length to diameter) of the fibers depends on the amount of dielectric loss desired. The concentration of fiberballs 24 affects the gross dielectric loss characteristics of the resin matrix, whereas the resistivity and aspect ratio of the fibers affects the dielectric loss characteristics of the individual fiberballs 24. However, it is noted that the degree of dielectric loss exhibited is not increased by the fiberballs 24 touching each other. In dielectric loss applications, the concentration of fiberballs 24 need not be extremely high. In fact, concentrations of fiberballs 24 on the order of one (1) percent can provide sufficient dielectric loss characteristics for some applications. However, in applications where the concentration of fiberballs 24 is lower than that necessary to ensure a substantially uniform distribution throughout the resin 22 (i.e. where they are not packed tightly enough to touch each other), steps must be taken to create a uniform distribution. This is necessary to provide an isotropic characteristic to the material. Methods for obtaining uniform distribution of dopants in resin matrix material are known in the art it is believed these same methods will be successful in creating the aforementioned uniform distribution of fiberballs 24 within the resin. As these methods are known, and do not constitute a novel part of the present invention, they will not be expounded upon herein. However, it should be noted that these same methods would be employed to produce resin matrix materials with enhanced conductivity where a relatively low concentration of fiberballs 24 is used. For example, in foamed resin matrix material where weight must be minimized.

Figure 3:
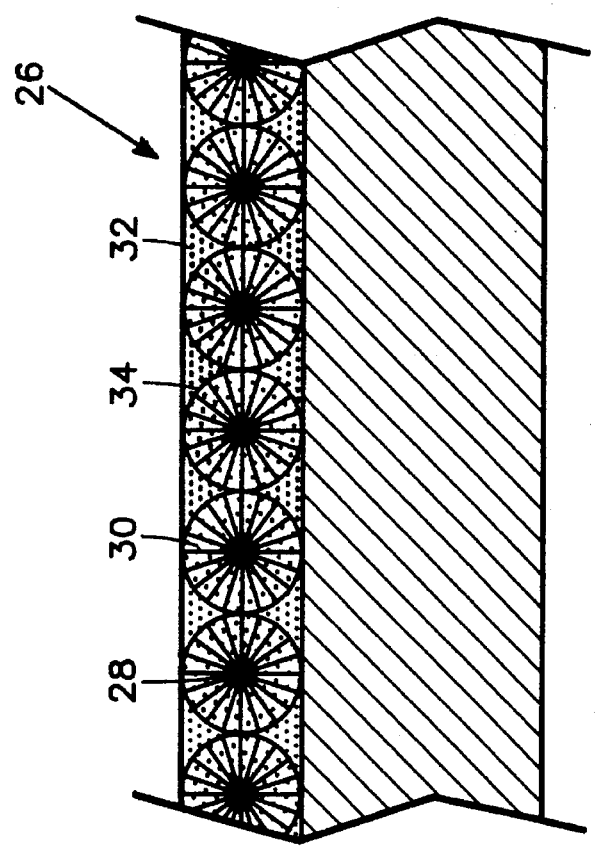
FIG. 3 is a cross-sectional view of a parasitic layer made of a resin matrix material embodying the present invention wherein the resin matrix material includes a resin uniformly doped with encapsulated fiberballs saturated with a phase change material.

A parasitic layer 26 having enhanced heat dissipation capacity is shown in FIG. 3. In this case, the fiberballs 28 are first saturated with an appropriate phase change material 30. Then, the saturated fiberballs are individually encapsulated in a shell 34 which retains the phase change material within the fiberball 28 when it is in a liquid phase. The phase change material 30 is chosen for the temperature range to which the parasitic layer 26 is to be subjected. The material should be in a solid phase up to the temperature where heat dissipation is desired. At that temperature, the material should liquefy, thereby absorbing some of the heat that would otherwise be transferred. The retaining shell 34 can be made of any material, as long as it remains intact at the temperatures the saturated fiberballs 28 are likely to experience. The fiberballs 28 could even be saturated with wax and encapsulated in a glass shell to mimic the operation of the aforementioned wax-filled microballoons. However, if this were the case, the fiberball 28 disposed within the glass shell would increase the speed at which the heat is dissipated, and allow for the saturated fiberballs 28 to be larger than the microballoons.

The reason these encapsulated phase change material saturated fiberballs 28 increase the speed of heat transfer and can be larger than the glass microballoons is that the heat impinging on the shell 34 is transferred through the shell 34 and to the fibers of the fiberball 28. Thus, heat is carried by the fibers into the bulk of the phase change material 30. This is opposed to a conventional glass microballoon system where the heat is merely transfer from the inside surface of the glass to the outer regions of the wax contained therein. In the system according to the present invention, the fibers of the fiberballs 28 afford a significantly larger heat transfer surface area, so that more heat can be transferred to the phase change material per unit of time. In addition, the high thermal conductivity of the preferred carbon fibers making up the fiberballs 28 acts to further augment the speed of heat transfer. As to the larger size of the fiberball system, one of the reasons that the conventional glass microballoon had to be so small derived from a desire to expose as much of the wax to the interior surface of the glass as was possible to maximize the heat transfer rate. It was found that the smaller the glass microballoon, the faster the heat transfer. However, since the fibers of the fiberball 28 carry the heat throughout the phase change material 30 in the system according to the present invention, the diameter of the shell 34 need not be kept to a minimum. Thus, the encapsulated fiberballs 28 can be larger. As mentioned previously, it is believed less expensive to encapsulate the phase change material saturated fiberballs 28 than to manufacture the wax-filled glass microballoons.

Similar to previously described embodiments, the encapsulated phase change material saturated fiberballs 28 are also isotropic in nature. The heat energy is transferred uniformly throughout the radial fibers of the fiberball 28, no matter which direction it is applied. Here again too, the concentration of the encapsulated fiberballs 28 in the resin 32 should be as high as possible without unacceptably degrading the mechanical properties of the resin matrix structure to ensure maximum heat dissipation capability. However, if a lower concentration is employed which would not result in the fiberballs 28 being packed tight enough to generally touch one another, the distribution of fiberballs 28 must be made uniform via the aforementioned known methods. This is necessary to ensure a uniform heat dissipation profile throughout the overall resin matrix structure, independent of the point where the heat is applied. Such a lower concentration might be employed where the weight of the material must be minimized.

While the invention has been described in detail by reference to the preferred embodiment described above, it is understood that variations and modifications thereof may be made without departing from the true spirit and scope of the invention.

Wherefore, what is claimed is:

1. An isotropic resin matrix material comprising:
   (a) resin; and,
   (b) a plurality of fiberballs having electrically and thermally conductive fibers generally radiating outward from a common node; and wherein,
   (c) the fiberballs are uniformly distributed throughout the resin.

2. The isotropic resin matrix material according to claim 1, wherein:
   the space separating the fibers of the fiberball is saturated with resin.

3. The isotropic resin matrix material according to claim 1, wherein:
   the number of fiberballs disposed within the resin matrix material creates a prescribed level of electrical and thermal conductivity without degrading the mechanical properties of the material beyond predetermined limits.

4. The isotropic resin matrix material according to claim 3, wherein:
   the number of fiberballs disposed within the resin matrix material is further limited so as not to exceed a predetermined weight per unit volume of the material.

5. The isotropic resin matrix material according to claim 3, wherein:
   the fiberballs are of at least two different diameters, said diameters being chosen to maximize packing of the fiberballs within the resin.

6. The isotropic resin matrix material according to claim 1, wherein:
   the fibers are carbon fibers.

7. The isotropic resin matrix material according to claim 2, wherein:
   the number, fiber resistivity, and fiber aspect ratio of the fiberballs disposed within the resin matrix material creates a prescribed dielectric loss characteristic without degrading the mechanical properties of the material beyond predetermined limits.

8. The isotropic resin matrix material according to claim 7, wherein:
   the number of fiberballs disposed within the resin matrix material is further limited so as not to exceed a predetermined weight per unit volume of the material.

9. The isotropic resin matrix material according to claim 1, wherein:
   (a) the space separating the fibers of the fiberball is saturated with a phase changing material, said phase changing material being capable of changing phase at a desired temperature; and,
   (b) the fiberball saturated with phase change material is encapsulated by a shell.

10. The isotropic resin matrix material according to claim 9, wherein:
    the number of fiberballs disposed within the resin matrix material creates a prescribed amount of heat dissipation capacity without degrading the mechanical properties of the material beyond predetermined limits.

11. The isotropic resin matrix material according to claim 10, wherein:
    the number of fiberballs disposed within the resin matrix material is further limited so as not to exceed a predetermined weight per unit volume of the material.

12. The isotropic resin matrix material according to claim 9, wherein:
    the fiberballs are of at least two different sizes, said sizes being chosen to maximize packing of the fiberballs within the resin.

13. A method of producing an isotropic resin matrix material comprising the step of:
    mixing resin and a plurality of fiberballs having electrically and thermally conductive fibers generally radiating outward from a common node, such that the fiberballs are uniformly distributed throughout the resin.

14. The method of claim 13, further comprising the step of:
    saturating the spaces separating the fibers of the fiberballs with said resin prior to the mixing step.

15. The method of claim 13, wherein:
    the number of fiberballs mixed into the resin is limited to that which creates a prescribed level of electrical and thermal conductivity without degrading the mechanical properties of the material beyond predetermined limits.

16. The method of claim 15, wherein:
    the number of fiberballs mixed into the resin is further limited so as not to exceed a pre-determined weight per unit volume of the material.

17. The method of claim 15, wherein the mixing step further comprises:
    mixing fiberballs having at least two different diameters, wherein said diameters are chosen to maximize packing of the fiberballs within the resin.

18. The method of claim 14, wherein:
    the number, fiber resistivity, and fiber aspect ratio of the fiberballs mixed into the resin is limited to that which creates a prescribed dielectric loss characteristic without degrading the mechanical properties of the material beyond predetermined limits.

19. The method of claim 18, wherein:
    the number of fiberballs mixed into the resin matrix material is further limited so as not to exceed a pre-determined weight per unit volume of the material.

20. The method of claim 13, further comprising the steps of:
    prior to the mixing step,
    saturating the spaces separating the fibers of the fiberballs with a phase changing material, said phase changing material being capable of changing phase at a desired temperature, and, encapsulating the fiberballs saturated with phase change material.

21. The method of claim 20, wherein:

the number of fiberballs mixed into the resin is limited to that which creates a prescribed amount of heat dissipation capacity without degrading the mechanical properties of the material beyond predetermined limits.

22. The method of claim 21, wherein:

the number of fiberballs mixed into the resin is further limited so as not to exceed a pre-determined weight per unit volume of the material.

23. The method of claim 20, wherein the mixing step further comprises:

mixing fiberballs having at least two different diameters, wherein said diameters are chosen to maximize packing of the fiberballs within the resin.

* * * * *